June 21, 1938. F. TAHIR 2,121,191
WEIGHING OR CHECKING THE WEIGHT OF CIGARETTES
Filed Aug. 18, 1934
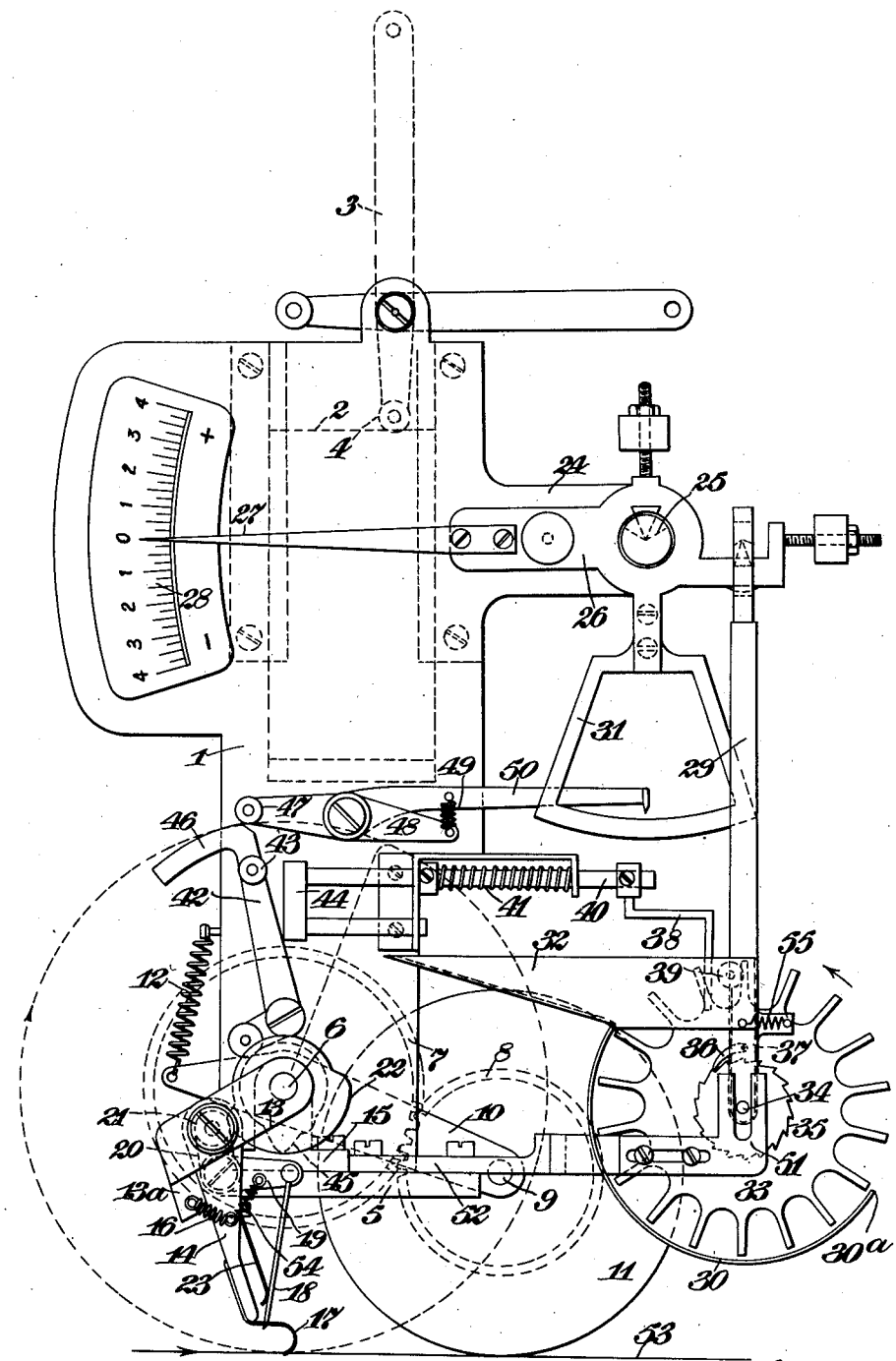
Feyzi Tahir, Inventor
by Sydney P. Prescott Atty

UNITED STATES PATENT OFFICE 2,121,191

WEIGHING OR CHECKING THE WEIGHT OF CIGARETTES

Feyzi Tahir, Fatih, Istanbul, Turkey, assignor to American Machine & Foundry Company, New York, N. Y., a corporation of New Jersey Application August 18, 1934, Serial No. 740,542
In Turkey October 26, 1933

18 Claims. (Cl. 265—27)

This invention relates to the weighing or checking the weight of cigarettes as delivered from a continuous rod cigarette making machine.

An object of the invention is to provide an improved and simplified apparatus by which cigarettes may be selected at predetermined intervals from a moving stream of cigarettes, for example, those being conveyed by a catcher belt, and to convey them to a weighing device, the cigarettes after the weighing or checking operation being automatically returned to the stream of cigarettes at an advanced region of the stream relatively to the selecting position.

The weighing of the cigarettes may be recorded upon a continuous record sheet moving in synchronism with the cigarette making machine, or may be used automatically to control the tobacco feed of the machine.

The present invention comprises a machine for weighing or checking the weight of cigarettes comprising means for selecting cigarettes at intervals from a stream of cigarettes and transferring them to a weighing device from which the weighed cigarettes are automatically returned to the stream.

Preferably, the weighing device comprises means adapted continuously to weigh a predetermined number of cigarettes. Preferably the selecting and transferring device rotates about an axis at right angles to the direction of movement of the stream.

The weighing device may comprise a rotary fluted element co-operating with a scale pan or shield to control the discharge of the cigarettes one by one from the pan.

Further features of the invention will be hereinafter described and defined in the claims.

The accompanying drawing illustrates diagrammatically in front view a weighing or weight checking machine according to the invention.

In carrying the invention into effect according to one convenient mode by way of example, a framework 1 is provided which is mounted upon a block or bracket 2 so as to be slidable relatively thereto. The bracket is adapted to be mounted in any convenient manner upon the machine to which the invention is to be applied, or it may be carried by an independent bedplate or support. A lever 3 is pivotally mounted upon the framework, and is provided with a roller 4 adapted to engage the upper surface of the block, whereby the framework may be lowered into operative position or lifted into an inoperative position.

The frame at its lower end is flanged at 5, and supports bearings 15 for a spindle 6 which is driven by gear wheel 7 which is fixed to the spindle, and in mesh with gear wheel 8 mounted on the spindle 9 carried by the levers 10. The spindle 9 has a driving wheel or roll 11 fixed to it which is adapted to engage a moving element such as a catcher belt represented by the line 53, whereby a drive is communicated to the main spindle 6. The levers 10 pivot upon the main spindle and springs 12 are provided whereby the roll 11 is resiliently pressed upon the catcher belt or the like to create the necessary friction.

The spindle 6 carries a lever 13 upon which an arm 14 is pivotally mounted, said arm normally abutting against a stop or shoulder 13a of the lever 13, under the action of a spring 16.

The arm 14 at its outer end carries a scoop 17 which is shaped and is of a size to accommodate a single cigarette. Co-operating with the scoop and adapted to retain a cigarette therein is a finger or forked element 18 extending through an aperture in the scoop and pivotally carried by an arm 19 of a bell crank lever carried by the arm 14. The other arm 20 of the bell crank lever is provided with a roll 21 adapted to engage a stationary cam 22 which is fixed to the bearing 15.

The action of the cam 22 is such that the finger 18 is adapted to close the scoop and prevent the cigarette falling out as the scoop is rotated until the scoop reaches a predetermined position where the finger is withdrawn by the action of the cam and the cigarettes released. A spring 54 is provided for holding the roll 21 to the cam 22.

The slot in the scoop accommodating the finger 18 is elongated and a light spring 23 is provided by which the cigarettes are resiliently gripped by the finger.

The framework 1 has an extension 24 provided with bearings 25 for a scale beam or lever 26, having a pointer 27 traversing a scale 28. The scale lever carries an arm 29 upon which a scale pan 30 is mounted, being counter-poised by the pendulum 31. The scale pan comprises an arcuate shield member to which is connected a chute 32 fixed to the arm 29. Located within the shield and concentric therewith is a fluted member 33, which is carried by the spindle 34 supported by the arm 29. The extent of the shield is such that nine of the lower flutes of the member 33 are closed.

The fluted member 33 is adapted to be rotated step by step, one flute at a time, and for this purpose a ratchet wheel 35 is mounted on the member 33 or the spindle 34 of the latter is fixed to member 33. A pawl 36 carried by a short lever 37 is adapted to engage the ratchet wheel. The lever 37 is freely mounted upon the spindle 34, and is adapted to be positively reciprocated clockwise as seen in the figure against the action of a spring 55. On the return of the lever by the spring, the pawl is effective to turn the fluted member one step.

The positive stroke of the pawl lever is effected by the bar 38 engaging a roller 39 carried by the pawl lever 37. The bar 38 is adjustably mounted upon the rod 40 which is reciprocated against the action of a returning spring 41 by the bell crank lever 42 which carries a roller 43 adapted to engage the plate 44 carried by the rod 40.

The bell crank lever 42 is actuated by the rotary cam 45 mounted upon the spindle 6 so that for each revolution of the spindle the rod 40 is actuated and the fluted member indexed.

The bell crank lever 42 is provided with a cam piece 46 adapted under the action of the cam 45 to engage a roll 47 on the lever 48 and pivot the latter. The lever 48 is resiliently coupled by a spring 49 to a lever 50, whereby on actuation of the lever 48 by the cam piece 46 the lever 50 is brought to bear resiliently on the pendulum 31.

The arrangement is such that in order to steady the balance, prior to the rod 40 functioning, the lever 50 is brought into engagement with the pendulum. It will be noted that there is a period of lost motion before the roll 43 engages the plate 44 during which period the lever 50 is actuated.

In order that the thrust of the bar 38 shall not unduly swing the scale pan arm 29, and thus prevent the actuation of the pawl, the spindle 34 is extended and is freely guided in a slotted arm 51 which is adjustably carried upon an arm 52 mounted upon the flange 5 of the framework.

In operation, the framework is lowered by the actuation of the lever 3 so that the roll 11 engages the catcher or collector belt, and the parts are in position so that the scoop 17 in its rotation will pass close to the catcher belt. The scoop arm 14 is rotated clockwise and picks up a cigarette from the stream on the belt, which cigarette is retained in the scoop by the finger 18 as the roll 21 runs down the cam 22. The cigarette is retained in the scoop until the latter reaches a position above the chute 32, in which position the roll 21 runs up the cam 22, causes a retraction of the finger 18 and releases the cigarette which falls into the chute down which it rolls into the appropriate flute of the member 33.

It will be appreciated that during operation there will be ten cigarettes in the scale pan, i. e. nine in the flutes closed by the shield 30 and one in the next flute adjacent the chute 32. It will be assumed that ten cigarettes are thus present in the scale.

Prior to the scoop 17 reaching the cigarette release position, the rotary cam 45 actuates the pawl lever 37 through the bell crank 42, rod 40 and lever 38, whereby the fluted member is rotated one step to deliver a cigarette over the edge 30a of the shield, convey the remaining cigarettes forward one step and bring an empty flute into position to receive the cigarette about to be delivered from the scoop 17.

Each cigarette as delivered over the edge 30a of the scale pan is returned to the stream of cigarettes or collector belt.

The scoop 17 selects one in say fifty cigarettes as according to the relative speeds of the scoop and the catcher belt. In this connection it will be noted that while it is preferred to construct the apparatus as a self-contained unit and thus the drive is effected by friction from the catcher belt by means of the roll 11 any other form of drive may be provided.

According to the preferred arrangement, the scoop 17 is adapted to select single cigarettes from the stream on the catcher belt. It will be obvious, however, that the scoop may be constructed to accommodate more than one cigarette, the flutes of the fluted member 33 being also shaped to take a similar member.

Moreover, while the scale pan has been described as continuously weighing ten cigarettes, the fluted member 33 and the shield 30 may be arranged to take any other suitable number.

I claim:

1. The combination with a device for weighing cigarettes, of means for automatically selecting cigarettes at intervals from a stream of cigarettes and transferring them to said weighing device, said device comprising a scale pan having a rotary fluted member and a relatively stationary shield extending over a predetermined number of flutes so that the fluted member as it rotates discharges and receives an equal number of cigarettes whereby there is always a predetermined number of cigarettes present on the scale pan.

2. The combination with a device for weighing cigarettes, of a scoop mounted for rotation about an axis, means for rotating the scoop to cause it to select cigarettes at intervals from a stream of cigarettes moving at right angles to said axis and deliver them intermittently to said weighing device, said device comprising a scale pan having a rotary fluted member and a relatively stationary shield adapted to close a predetermined number of flutes so that the fluted member as it rotates discharges and receives an equal number of cigarettes whereby there is always a predetermined number of cigarettes present on the scale pan.

3. The combination with a device for weighing cigarettes, of a rotary scoop adapted to select a single cigarette at each revolution from a stream of cigarettes and deliver them to said weighing device, said device comprising a scale pan having a rotary fluted device and a relatively stationary shield adapted to close a predetermined number of flutes, and means for intermittently rotating the fluted device a distance equal to the distance between the centers of the flutes whereby a cigarette is received and a cigarette discharged at each stepping movement.

4. The combination with a device for weighing cigarettes, of a scoop mounted for rotation about an axis, means for rotating the scoop to cause it to select cigarettes at intervals from a stream of cigarettes moving at right angles to said axis and transfer them to said weighing device, and cam controlled means moving with said scoop for retaining the cigarettes in the scoop during the transfer.

5. The combination with a device for weighing cigarettes, of a rotary selecting device for selecting cigarettes at intervals from a stream of cigarettes and transferring them to said weighing device, said device having a scale pan comprising a rotary fluted member, the distance between the centers of the flutes being uniform, and a stationary shield adapted to close a predetermined number of said flutes, means for stepping the fluted member the distance between the centers of adjacent flutes so as to deliver a cigarette past one end of the shield, and cam controlled means for retaining the cigarettes in the selecting device during the transfer and operating to release a cigarette after the stepping of the fluted member.

6. A machine for weighing cigarettes as claimed in claim 5 wherein the stepping of the fluted member is effected by a pawl and ratchet device which is controlled by a rotary cam.

7. A machine for weighing cigarettes as claimed in claim 5 wherein the stepping of the fluted member is operated by a pawl and ratchet device under the control of a rotary cam, said cam operating through a bell crank lever which actuates a scale steadying device prior to the actuation of the ratchet.

8. The combination with a device for weighing cigarettes, of a cigarette selecting device mounted for rotation upon a spindle, means for rotating the spindle to cause said device to select a cigarette from a stream of cigarettes upon a travelling conveyor and deliver it to said weighing device, a lever pivoted on the axis of said spindle, a friction roller carried by the lever and adapted to engage the conveyor whereby it is rotated, means for transmitting rotation from said roller to said spindle and means for resiliently pressing the friction roller onto the conveyor.

9. A machine for weighing cigarettes as claimed in claim 8 wherein the mechanism is carried by a framework slidably mounted in a bracket whereby the machine may be displaced vertically into or out of operative relation with the conveyor.

10. The combination with a weighing device, of means for selecting cigarettes from a stream and conveying them to said weighing device comprising a spindle mounted transverse to the direction of movement of said stream, means for rotating the spindle, an arm resiliently mounted upon said spindle and having a scoop adapted to receive a cigarette, means for retaining the cigarette in the scoop until it reaches the delivery point.

11. Means for weighing cigarettes comprising a rotary fluted member, a scale beam supporting said member, a relatively stationary shield covering a predetermined number of said flutes and means for intermittently rotating the fluted member a distance equal to the distance between the center of the flutes, the arrangement being such that the fluted member as it rotates discharges and receives an equal number of cigarettes whereby a predetermined number of cigarettes is always present in the flutes for weighing.

12. The combination with a device for simultaneously weighing a plurality of cigarettes, of a travelling conveyor for forwarding a stream of cigarettes, means for automatically selecting cigarettes at intervals from said stream of cigarettes on said conveyor and transferring them to said weighing device, and means for automatically returning the selected cigarettes one by one periodically from the weighing device to said conveyor upon the transfer of a succeeding selected cigarette to said weighing device.

13. The combination with a device for weighing cigarettes, of means for automatically selecting cigarettes at intervals from a stream of cigarettes and transferring them to said weighing device, said device including means intermittently traveling in an endless path for advancing the cigarettes being weighed during the weighing operation and return them to said stream upon the transfer of a succeeding selected cigarette to said weighing device.

14. The combination with a device for weighing cigarettes, of a conveyor below said device for forwarding a stream of cigarettes sidewise, a scoop mounted for rotation about an axis at right angles to the direction of movement of said stream of cigarettes, and means for rotating said scoop to cause it to select cigarettes at intervals from said stream of cigarettes and lift and deliver them to said weighing device.

15. The combination with means for forwarding a stream of cigarettes, of a cigarette weighing device including a scale beam and means carried by the scale beam travelling in an endless path for advancing cigarettes while the cigarettes are being weighed, and transfer mechanism for transferring cigarettes from said stream to said advancing means, said advancing means comprising a rotary drum having peripheral pockets for receiving a predetermined number of cigarettes.

16. The combination with a traveling belt conveyor adapted to advance a stream of cigarettes, of a device for weighing cigarettes, and means driven from said conveyor for automatically selecting cigarettes from said stream and transferring them to said device, said means being driven by direct contact with said conveyor and means operable readily to effect rapid engagement and disengagement of said driven means with respect to said conveyor, while said elements retain their assembled relationship.

17. The combination with a device for weighing cigarettes, of means for continuously forwarding a stream of cigarettes below said device, and mechanism including a continuously revolving cigarette engaging member coacting with said forwarding means at intervals during which a plurality of cigarettes pass without selection, to transfer selected cigarettes to said device, said device being arranged to weight the accumulated cigarettes from a plurality of said selections.

18. The combination with a device for weighing cigarettes, said device being adapted to contain a series of cigarettes, of means for peridodically selecting a cigarette at intervals of substantial extent from a rapidly advancing stream of cigarettes and transferring each selected cigarette to said device; complemental means, actuated by the operation of said weighing device, for returning to said stream from said device a cigarette of said series therein, simultaneously with said transfer of a cigarette thereinto, whereby there will always be the same number of cigarettes in the weighing device, thereby avoiding abrupt fluctuations of the weight-indicating means, conveyor means actuated in timed relationship with said selecting means, and means to indicate continuously the varying average weight of said uniformly numerous cigarettes in said weighing device.

FEYZI TAHIR.